United States Patent [19]
Knigga et al.

[11] Patent Number: 5,277,064
[45] Date of Patent: Jan. 11, 1994

[54] THICK FILM ACCELEROMETER

[75] Inventors: Bradley R. Knigga; Dwight L. Schwarz; Maged Radamis, all of Kokomo, Ind.; Michel F. Sultan, Troy, Mich.

[73] Assignees: General Motors Corporation, Detroit, Mich.; Delco Electronics Corp., Kokomo, Ind.

[21] Appl. No.: 864,708

[22] Filed: Apr. 8, 1992

[51] Int. Cl.$^5$ .............................................. G01P 15/12
[52] U.S. Cl. ...................... 73/517 R; 73/522
[58] Field of Search ............... 73/514, 517R; 517AV; 522, 338/2, 338/5, 43, 47

[56] References Cited

U.S. PATENT DOCUMENTS

| 4,050,049 | 9/1977 | Youmans | 338/47 |
| 4,706,374 | 11/1987 | Murakami | 437/225 |
| 4,901,570 | 2/1990 | Chang et al. | 73/517 |
| 4,990,986 | 2/1991 | Murakami et al. | 357/26 |

FOREIGN PATENT DOCUMENTS 0456285 11/1991 European Pat. Off. .......... 73/517 R

Primary Examiner—Hezron E. Williams
Assistant Examiner—Michael Brock
Attorney, Agent, or Firm—Robert J. Wallace

[57] ABSTRACT

An accelerometer is provided which is suitably rugged for use in on-board automotive safety control and navigational systems. The preferred thick film accelerometer is formed from an alumina substrate having an integrally formed U-shaped flexure member which surrounds an intermediate support member. A mass is provided on the unsupported end of the U-shaped flexure member. Deflection is maximum at the unsupported end of the U-shaped flexure member, while strain is maximum at the supported end of the flexure member. Four piezoresistors for detecting the strain within the flexure member corresponding to the acceleration in the direction perpendicular to the plane of the support member are provided on the U-shaped flexure member adjacent its supported ends. The four piezoresistors form a Wheatstone bridge, whose analog output voltage is conditioned and amplified to provide the output signal. The signal conditioning and amplifying circuitry are preferably located on the support member. The preferred accelerometer package further contains integrally formed means for preventing excessive deflection of the mass past a predetermined distance.

12 Claims, 3 Drawing Sheets

THICK FILM ACCELEROMETER

This invention generally relates to sensors of the accelerometer type. More specifically, this invention relates to a thick film accelerometer having an integrally formed U-shaped, cantilevered flexure member and deflection stop means, wherein such a thick film accelerometer is characterized by sufficient ruggedness and reliability so as to be suitable for use in an automotive environment.

BACKGROUND OF THE INVENTION

An accelerometer is one of the primary sensors used in on-board automotive safety control systems and navigational systems, particularly crash sensing systems. Examples of such automotive applications include anti-lock braking systems, active suspension systems, supplemental inflatable restraint systems such as air bags, and seat belt lock-up systems. An accelerometer is a device which measures acceleration, or more accurately, accelerometers measure the force that is exerted by a body as the result of a change in the velocity of the body. A moving body possesses inertia which tends to resist the change in velocity. It is this resistance to any change in velocity that is the source of the force which is exerted by the moving body. This force is directly proportional to the acceleration component in the direction of movement when the moving body is accelerated.

In one form of a conventional type of accelerometer, a mass is suspended between two spring members which are coaxially attached on opposite sides of the mass. The mass is maintained in a neutral position so long as the system is at rest or is in motion at a constant velocity. When the mass-spring support system undergoes a change in velocity in the direction of the springs' axis, i.e. an acceleration or deceleration parallel the spring axis, the spring mounted mass will resist the movement because of its inertia. This resistance to the change in velocity will force one of the springs to be in tension while the other spring is compressed. Accordingly, the force acting on each spring is equal but opposite in magnitude to the force acting upon the other. From this, the acceleration component can be determined.

Analogously, another common type of accelerometer employs a cantilevered beam wherein the mass is disposed on the unsupported end of the beam. Upon acceleration of the mass in a direction perpendicular to the plane of the mass, the beam will deflect, causing one surface of the beam to be in compression and the other surface to be in tension. The acceleration component in the direction perpendicular to the plane of the beam can then be measured using various known means.

In many of these types of accelerometers it is desirable to limit the displacement of the mass, so as to maximize the integrity and life of the device. Current designs do not provide a satisfactory means for limiting this displacement, particularly when employing an accelerometer which utilizes a cantilevered beam.

In addition, although there are several different types of accelerometers currently available commercially, they are generally typified by the same shortcomings which make them unsatisfactory for high volume automotive use. In particular, many of the current accelerometers are characterized by extremely high production costs, without the requisite long life durability for highly rugged applications, such as in an automotive environment.

Therefore, it is desirable to provide an accelerometer which meets the requirements of reliability, accuracy, ruggedness and low cost, for an on-board automotive system, as well as other applications, and further which alleviates the shortcomings of the prior art, in particular, by providing an integral means for limiting the displacement of the proof mass.

SUMMARY OF THE INVENTION

It is an object of the present invention to provide an accelerometer which is suitable for use in automotive applications and manufacturable by automotive production techniques.

It is a further object of this invention that such an accelerometer utilize thick film manufacturing and processing techniques.

It is still a further object of this invention that such an accelerometer include means for preventing undesirable excessive deflection of the mass.

In accordance with a preferred embodiment of this invention, these and other objects and advantages are accomplished as follows.

An accelerometer is provided which is suitably rugged for use in on-board automotive safety control and navigational systems. The preferred thick film accelerometer is formed from an alumina substrate. Integrally formed with a base portion is a U-shaped flexure member and a support member that is rigidly attached to an underlying backplate. The U-shaped, cantilevered flexure member surrounds the support member so that a gap exists substantially everywhere therebetween the U-shaped flexure member and the support member.

A mass is provided on the unsupported end of the U-shaped flexure member, so that the support member is disposed substantially intermediate between the base portion and the mass. With this preferred embodiment, deflection is maximum at the unsupported end of the U-shaped flexure member, while strain is maximum at the supported end of the beam adjacent the base portion.

Means for detecting the change in the acceleration in the direction perpendicular to the plane of the support member are provided on the U-shaped flexure member adjacent the base portion. Preferably the detection means consists of four piezoresistors, two on the top surface of the U-shaped flexure member so as to be oppositely disposed around the support member, and two similarly located on the bottom surface of the U-shaped flexure member. When the U-shaped member deflects downward, the resistance of the top two piezoresistors increases under tension while that of the bottom two piezoresistors decreases under compression. The four piezoresistors form a Wheatstone bridge, whose analog output voltage is conditioned and amplified to provide the output signal. The signal conditioning and amplifying circuitry are preferably located on the support member.

The preferred accelerometer package further contains integrally formed means for preventing excessive deflection of the mass past a predetermined distance. The mass, which is preferably provided on both surfaces (top and bottom) of the unsupported end of the U-shaped flexure member, slightly overhangs the rigidly affixed support member. Therefore the mass is permitted to deflect only slightly yet sufficiently, in either direction perpendicular to the plane of the mass, but upon excessive deflection in either direction the mass contacts the support member, thereby preventing excessive deflection of the U-shaped flexure member.

A particularly advantageous feature of this invention is that the accelerometer is formed using conventional, proven thick film processing techniques, so as to readily produce an accelerometer generally characterized by reliability, accuracy, ruggedness and low cost, making it suitable for an on-board automotive system, as well other applications. In addition, a single substrate is employed for formation of the accelerometer containing the cantilevered flexure member and the support member which has the detection means and the signal conditioning circuitry. Further, the mechanical stops which prevent excessive deflection of the flexure member are also integrally formed with the accelerometer package.

Other objects and advantages of this invention will be better appreciated from the detailed description thereof, which follows.

Brief Description of the Drawings

The above and other advantages of this invention will become more apparent from the following description taken in conjunction with the accompanying drawings wherein.

Detailed Description of the Preferred Embodiments

Figure 1:
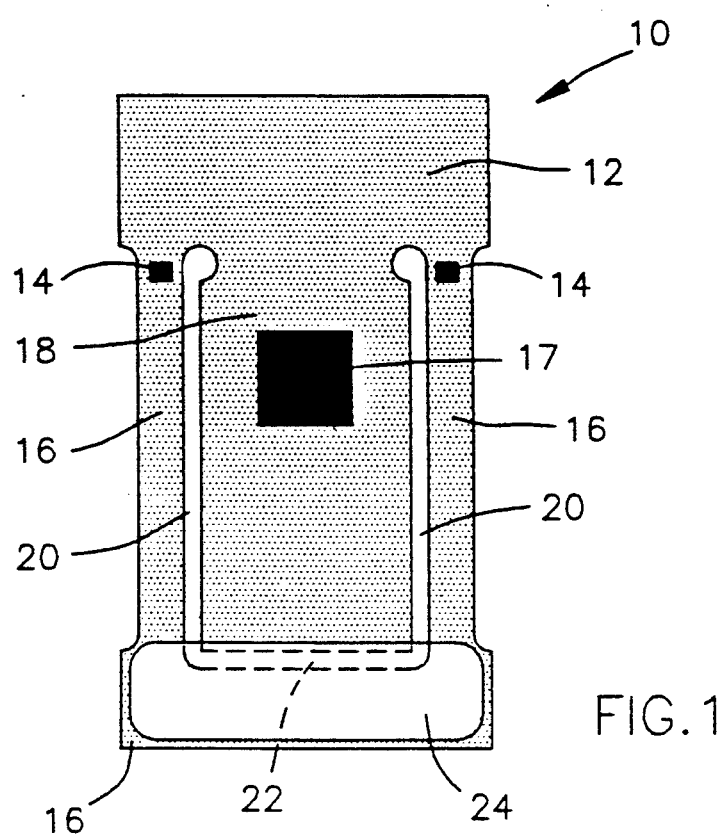
FIG. 1 is a top view of an accelerometer in accordance with a preferred embodiment of the present invention.
Figure 2:
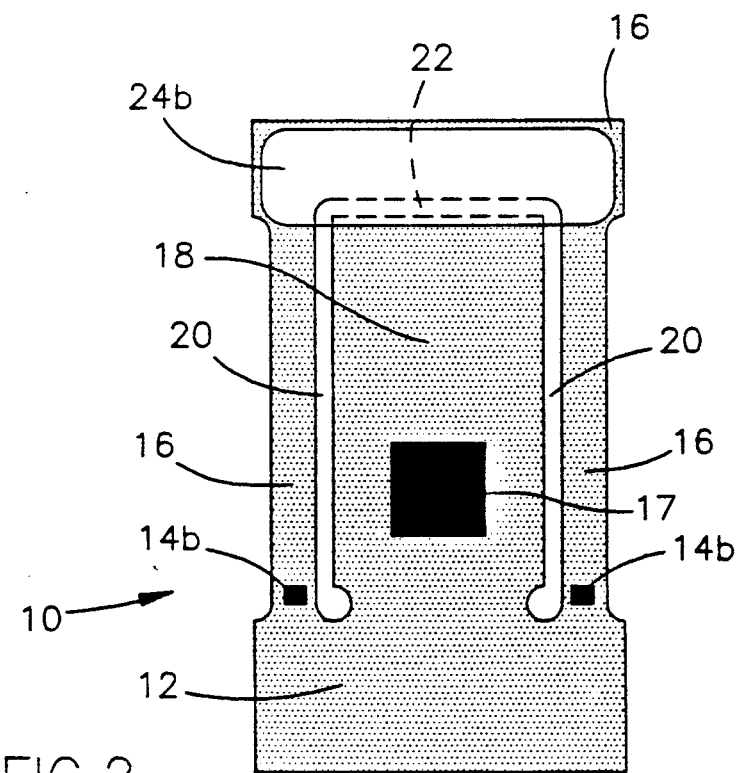
FIG. 2 is a bottom view of the accelerometer shown in FIG. 1.

Shown in FIG. 1 is a first surface (for convenience it will be referred to as the top surface) of a thick film accelerometer 10 in accordance with a preferred embodiment of this invention. The opposite surface (or bottom surface) of the accelerometer 10 is shown in FIG. 2. The bottom surface is essentially identical to the top surface shown in FIG. 1. The preferred accelerometer 10 is suitable for use in on-board automotive safety control and navigational systems.

The preferred thick film accelerometer 10 is formed from an alumina substrate. The accelerometer 10 has a base portion 12, cantilevered U-shaped flexure member 16, and a rigidly affixed support member 18. As discussed more fully later, the accelerometer 10 is secured to an appropriate backplate so as to rigidly support the base portion 12 and support member 18 while allowing deflection of the U-shaped flexure member 16. As shown, the support member 18 is integral with the base portion 12. The base portion 12 and support member 18 could be of an alternative shape, as compared to their rectangular shapes shown, however for efficient economy of design, the rectangular shapes are preferred.

The cantilevered U-shaped flexure member 16 is also formed to be integral with the base portion 12. As shown, the two side beams 16 of the U-shape are integral with the base portion 12. In addition, as shown, the two side beams 16 are thinned along their length which permits greater deflection during acceleration, thereby enhancing the output signal of the accelerometer 10. This is not necessary, although it is preferred.

The U-shaped flexure member 16 surrounds the support member 18 so that a gap (represented by reference numeral 20 along the side beams of the flexure member 16 and by reference numeral 22 along the unsupported end of the flexure member 16) exists substantially everywhere therebetween the U-shaped flexure member 16 and the support member 18. This gap 20, 22 which delineates the rigidly affixed base 12 and support members 18 from the cantilevered flexure member 16 is formed using conventional techniques, such as by ceramic green-punch techniques.

A mass 24, 24b is provided on both sides of the unsupported end of the U-shaped flexure member 16. The mass 24, 24b is preferably formed by attaching a sufficiently thick piece of die cast zinc on each side of the flexure member 16. (Alternatively, the mass 24 could be a single piece which is essentially pocket-shaped, wherein the unsupported end of the flexure member 16 fits within the pocket region, so that the mass 24 essentially wraps around the unsupported end of the flexure member 16.) The thickness of each piece of the mass 24, 24b may vary, but must be sufficient to accentuate the deflection of the cantilevered flexure member 16 in a direction perpendicular to the plane of the support member 18 during acceleration. As an example, for an accelerometer 10 in accordance with this invention, the thickness of the alumina substrate from which the base portion 12, flexure member 16 and support member 18 are formed is about 0.025 inches, and the thickness of the mass 24, 24b provided on each surface of the substrate is about 0.2 inches, for a total mass 24, 24b thickness of about 0.425 inches.

The U-shape of the cantilevered flexure member 16 is preferred since it advantageously allows for the attachment of a relatively sizeable mass 16 at its unsupported end, while the two side portions of the flexure member 16 essentially allow deflection only in the direction perpendicular to the plane of the support member 18.

The support member 18 is disposed substantially intermediate between the base portion 12 and the mass 24. (Reference to mass 24 will include both layers of mass 24 and 24b, unless noted otherwise.) Although the support member 18 is not absolutely necessary, it is preferred since it helps to alleviate the tensional stresses encountered by the base portion 12 during deflection of the flexure member 16, and becaue it is sufficiently large to incorporate the required electronic circuitry.

Deflection of the cantilevered U-shaped flexure member 16 is maximum at its unsupported end where the mass 24 is disposed. Correspondingly, the strain encountered by the flexure member 16 during deflection is maximum at the supported end of each beam portion 16 adjacent the base portion 12.

Accordingly, means for detecting the strain resulting from the deflection of the flexure member 16, which corresponds to the change in the acceleration in the direction perpendicular to the plane of the support member 18, are provided on the U-shaped flexure member 16 adjacent the base portion 12. Preferably the detection means consists of four piezoresistors represented by reference numerals 14 and 14b. Two piezoresistors 14 are preferably provided on the top surface of the U-shaped flexure member 16 at the supported end of each beam of the flexure member 16, so as to be oppositely disposed around the support member 18. Similarly, two piezoresistors 14b are located on the bottom surface of the U-shaped flexure member 16 at its supported ends. The piezoresistors 14, 14b preferably formed by deposition onto the alumina substrate using conventional thick film deposition techniques, such as silk screening, although other techniques could also be used.

As the cantilevered U-shaped flexure member 16 deflects downwardly due to a change in acceleration in the direction perpendicular to the plane of the support member 18, the resistance of the top two piezoresistors 14 increases under tension while that of the bottom two piezoresistors 14b decreases under compression. Analogously, as the cantilevered U-shaped flexure member 16 deflects upwardly due to a change in acceleration in the opposite direction, the resistance of the top two piezoresistors 14 decreases under compression while that of the bottom two piezoresistors 14b increases under tension. The four piezoresistors 14, 14b form a conventional Wheatstone bridge. The analog output voltage from the Wheatstone bridge is conditioned and amplified reference numeral 17 to provide the output signal. The desired offset and sensitivity required for operation of the accelerometer 10 may be modified by conventional laser trimming operations of any or all of the piezoresistors 14, 14b, if desired.

The electrical circuitry required for signal conditioning and amplifying (reference numeral 17) are preferably provided by an appropriate integrated circuit chip that has been attached using conventional methods such as flip-chip technology, or alternatively, formed by deposition of the circuitry pattern onto the support member 18 using conventional thick film deposition techniques, such as silk screening. This is a particularly advantageous feature of this invention in that all of the mechanical and electrical components for the accelerometer 10 are essentially self-contained on a single alumina substrate.

Figure 3:
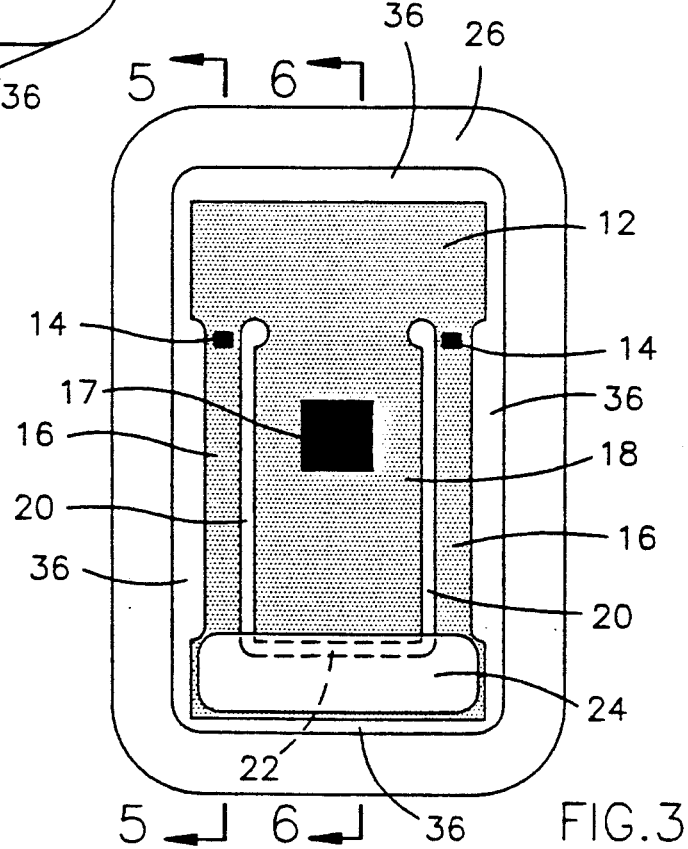
FIG. 3 is a top view of a packaged accelerometer assembly incorporating the accelerometer shown in FIG. 1.

With reference now to FIG. 3, which shows a top view of the packaged accelerometer assembly incorporating the preferred accelerometer 10, the accelerometer 10 is packaged within an interior, form-fitting structure 36 of a housing 26, so as to ensure rigid secure positioning of the accelerometer 10 within the housing 26. The housing 26 can be formed from a variety of materials which provide sufficient rigidity to the accelerometer 10 package, preferably a 30% glass-filled polyester, such as CELANEX 3300D, but other foreseeable materials include die cast aluminum or a suitable thermoplastic, as well as others.

Figure 4:
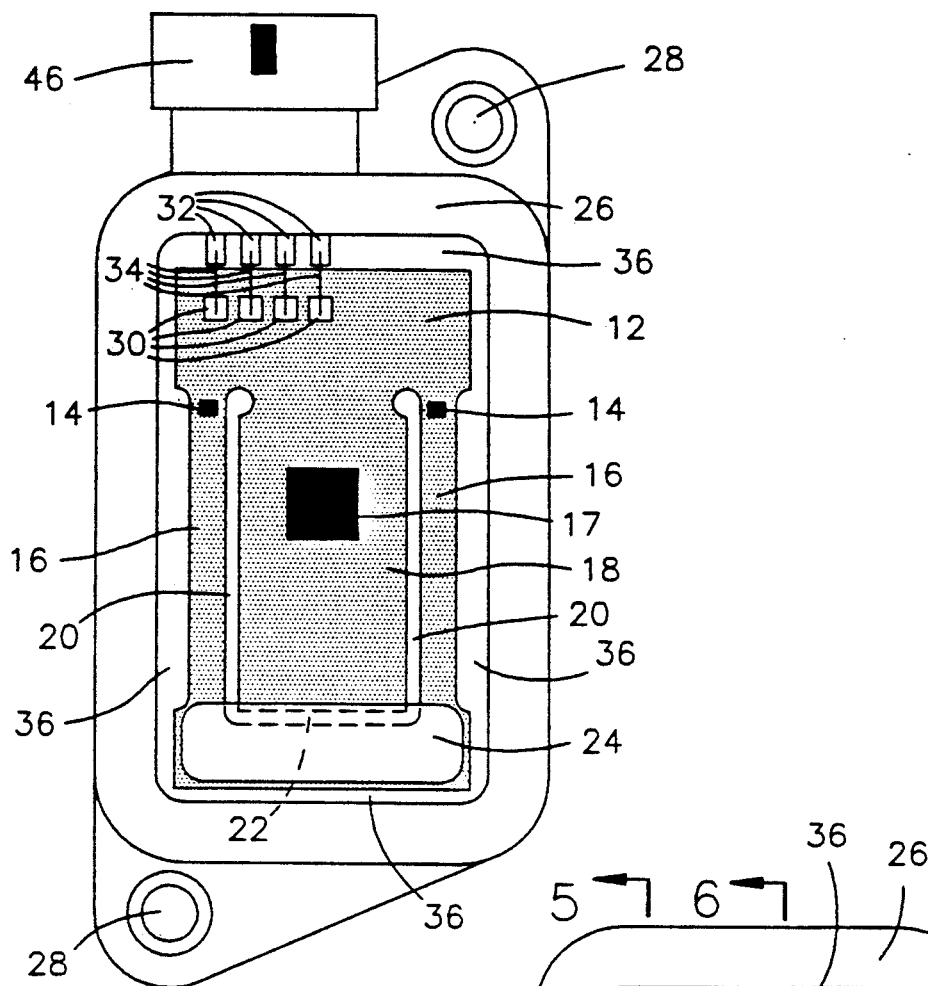
FIG. 4 is a top view of the preferred accelerometer package shown in FIG. 3 including mounting structures and electrical connections.

As shown in FIG. 4, the accelerometer 10 and housing 26 are further packaged to include appropriate electrical connections and mounting structures 28. Electrically conductive leads 34 are formed between bond sites 30 provided on the accelerometer 10 and bond sites 32 provided on the housing, so as to allow the accelerometer's input power and output signal to be transmitted to and from the signal conditioning thick film circuitry 17 provided on the support member 18. The electrically conductive leads 34 are formed by conventional wire bonding techniques, although other suitable manufacturing methods could also be used. The proximity of the two bonding regions 30, 32 facilitates the wire bonding process and also reduces the effect of electromagnetic interference. The electrically conductive leads 34 are subsequently connected to the external electronic equipment in an associated vehicle control system (not shown) by means of a conventional pin connection 46.

The housing 26 has at least a pair of oppositely disposed mounting structures 28. The rigidity of the housing 26 reduces the external stress transferred to the accelerometer 10, such stress being generated for example by securely attaching the mounting structures 28 against "uneven" mounting structures within the automobile.

Figure 5:
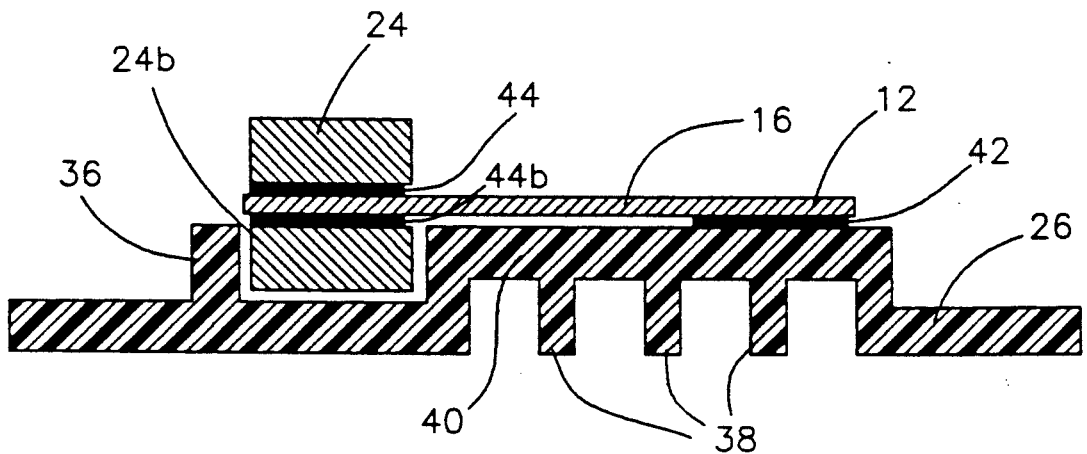
FIG. 5 is a cross-sectional view of the preferred accelerometer package taken along line 5—5 of FIG. 3.

FIG. 5 shows a cross-sectional view of the packaged accelerometer 10 taken along line 5—5 of FIG. 3 which is primarily through a side beam portion of the U-shaped flexure member 16. As stated previously, the base portion 12 is rigidly attached at region 42 to a backplate 40 which is integral with the housing 26. The base portion 12 is secured to the backplate 40 by a suitable bonding agent which is applied evenly onto the surface of the backplate 40 for uniform adhesion, and is preferably a silicone adhesive material such as Dow Corning QX-6265. Such a silicone adhesive is more resilient than an epoxy or other rigid mounting material, such that adhesive-transmitted mechanical stresses are greatly reduced. In addition, this layer 42 of resilient adhesive also prevents transfer of any stresses which may arise during the mounting of the accelerometer 10.

In addition, the mass 24, 24b is securely attached to the unsupported end of the flexure member 16 by means of a suitable adhesive 44, 44b deposited between the flexure member 16 and mass 24, 24b. Preferably, this adhesive is the above-named Dow Corning QX-6265, although other adhesives and epoxies could also be used. The unsupported end of the flexure member 16 having the mass 24, 24b is free to deflect within a cavity formed by the wall 36 of the housing 26, in response to acceleration in the direction perpendicular to the plane of the base portion 12 and flexure member 16. It is noted that the relative size of the mass 24, 24b is exaggerated for purposes of the description of this invention.

It is noted that several gaps between extensions 38 are preferably provided integral with the backplate 40 so as to reduce the amount of plastic material used, thereby minimizing the weight of the package while also limiting detrimental effects associated with shrinkage of the plastic during molding.

Figure 6:
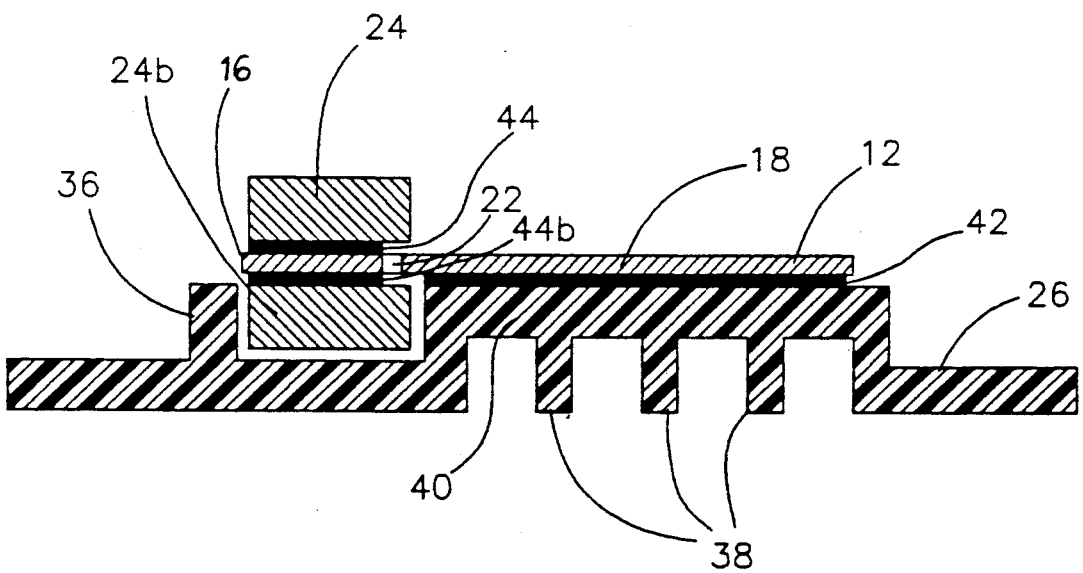
FIG. 6 is a cross-sectional view of the preferred accelerometer package taken along line 6—6 of FIG. 3.

As shown most clearly in FIG. 6, which is a cross-sectional view of the preferred accelerometer 10 taken along line 6—6 of FIG. 3 through the base portion 12, and mass 24, 24b the preferred accelerometer 10 further contains integrally formed means for preventing excessive deflection of the mass 24, 24b past a predetermined distance. The mass 24, 24b is preferably provided on both sides of the unsupported U-shaped flexure member 16, so that the mass 24, 24b slightly overhangs the rigidly affixed support member 18. As noted, the adhesive layer 42 used to affix the base portion 12 to the backplate 40 is provided continuously under the support member 18 also. The gap 22 between the flexure member 16 and support member 18 is apparent in FIG. 6. In addition, the intentional slight overhang of the mass 24, 24b compared to the support member 18, is sufficient to allow deflection of the U-shaped flexure member 16 within the cavity formed by the wall 36 of the housing 26, but upon excessive deflection in either direction the mass 24, 24b contacts the support member 18 so as to prevent excessive deflection of the U-shaped flexure member 16.

The structure of the preferred accelerometer 10 incorporating this inherent mechanical stopping feature is particularly advantageous in that the integrity and overall life of the accerlometer is greatly enhanced by alleviating excessive deflection of the cantilevered U-shaped flexure member 16. Yet, no additional components are required to provide the stopping means, since the stopping means are formed by the shape of the mass 24.

After the accelerometer 10 is packaged as described above, it is further packaged within a sealed canister, or other suitable container, for use in, for example, an automotive control system. It is preferred that the accelerometer 10 be sealed within the canister so as to prevent dirt, oil dust and other contamination from contacting the accelerometer 10.

It is to be noted that the preferred accelerometer 10 tends to oscillate at its natural frequency, however so as to achieve a frequency having a maximum bandwidth, such as greater than about 500 Hertz, the accelerometer 10 is preferably damped Damping the accelerometer is advantageous in that it not only increases the frequency bandwidth, but also because it reduces the amplitude of the vibrations at resonance, thereby reducing the risk of component breakage, particularly resulting from shock.

Damping is preferably achieved by utilizing a viscous silicone oil, which also serves as a passivating agent to protect the thick film circuitry. Viscous silicones which are electrically inert and which may be suitable for use in this application are commercially available over a wide range of viscosities. Generally, the silicone oils which would be useful in this application are characterized by a viscosity ranging from about 1000 centipoise to about 5000 centipoise. Damping with a viscous fluid is the preferred approach because it does not introduce an elastic component which reduces the sensitivity of the accelerometer. The amount of vibration reduction which would result in critical damping depends both on the viscosity of the surrounding fluid, as well as the geometry of the moving structure and its separation from the stationary parts. These determinations are within the knowledge of a routineer in the art, and therefore will not be discussed more fully here. The viscous silicone oil is introduced into the housing 26 before the outer canister or cover is sealed.

As stated previously, a significant advantage of this invention is that the accelerometer 10 is formed using conventional thick film processing techniques, so as to readily produce an accelerometer 10 characterized by reliability, accuracy, ruggedness and low cost. The thickfilm circuitry is beneficially characterized by a low thermal coefficient of electrical resistivity, while the mechanical properties of the alumina substrate are fully characterized, thereby providing a proven sensor unit. These characteristics make the accelerometer 10 suitable for use in an on-board automotive system, as well other applications.

In addition, another advantage is that a single alumina substrate is employed for formation of the accelerometer 10 containing the cantilevered U-shaped flexure member 16 and the support member 18 which has the detection means 14 and the signal conditioning circuitry. These components are all integrally formed on the alumina substrate. Further, the mechanical stopping means which prevent excessive deflection of the flexure member 16 are also integrally formed in the preferred accelerometer 10, so as to minimize the number of components within the sensor. The above structural characteristics of the preferred accelerometer 10 minimize the ability of extraneous vibrations and mechanical stresses to develop and become amplified in the vicinity of the accelerometer 10. As a result, the accelerometer 10 responds almost exclusively to the vehicle dynamics associated with acceleration and deceleration.

Therefore, while our invention has been described in terms of a preferred embodiment, it is apparent that other forms of the device could be adopted by one skilled in the art. By example, it is clear that these teachings could be used with modified or alternative materials, or with modified processing parameters, or with a modified structural design. Accordingly, the scope of our invention is to be limited only by the following claims.

The embodiments of this invention in which an exclusive property or privilege is claimed are defined as follows:

1. A thick film accelerometer on an alumina substrate having opposed planar major surfaces, said accelerometer comprising:
    an alumina substrate base portion;
    a support member integrally formed with said alumina substrate base portion;
    a U-shaped flexure member integrally formed with said alumina base portion essentially surrounding said support member so that a gap is provided substantially everywhere therebetween said U-shaped flexure member and said support member except at said alumina substrate base portion, whereby said U-shaped flexure member has an unsupported end capable of flexing under acceleration;
    a mass provided on the unsupported end of said U-shaped flexure member so as to be oppositely disposed to said alumina base portion; and
    means for detecting acceleration of said mass in a direction perpendicular to the major surfaces of said alumina substrate base portion and support member, wherein said means for detecting acceleration is provided on said U-shaped flexure member adjacent said alumina substrate base portion.

2. A thick film accelerometer as recited in claim 1 wherein said alumina substrate provides opposed planar major surfaces on said unsupported end of said U-shaped flexure member, and said mass is provided on both of said surfaces of said unsupported end of said U-shaped flexure member.

3. A thick film accelerometer as recited in claim 1 wherein said means for detecting acceleration comprises four piezoresistors electrically connected to form a Wheatstone bridge circuit.

4. A thick film accelerometer as recited in claim 1 further comprising a means for preventing excessive deflection of said mass past a predetermined distance in a direction perpendicular to opposed major surfaces of said base portion and said support member.

5. A thick film accelerometer as recited in claim 4 wherein said means for preventing excessive deflection of said mass is provided by configuration and disposition of said mass, wherein said mass is prevented from excessive deflection by contacting said support member.

6. A thick film accelerometer as recited in claim 1 further comprising signal conditioning and amplifying circuitry to produce an analog output voltage from an output voltage of said means for detecting acceleration, wherein said signal conditioning and amplifying circuitry is provided on said support member.

7. A thick film accelerometer as recited in claim 1 further comprising a backplate to which said base portion and said support member are rigidly secured.

8. A thick film accelerometer comprising a substantially flat alumina substrate having opposed planar major surfaces and said alumina substrate including:
- an alumina base portion;
- a support member integrally formed with said alumina base portion;
- a U-shaped flexure member integrally formed with said alumina base portion essentially surrounding said support member so that a gap is provided substantially everywhere therebetween said U-shaped flexure member and said support member except at said base portion, said U-shaped flexure member having opposed major surfaces and an unsupported end;
- a mass provided on both of said opposed major surfaces of the unsupported end of said U-shaped flexure member so as to be oppositely disposed on said surfaces from said alumina base portion, such that said support member is disposed substantially intermediate between said alumina base portion and said mass on said unsupported end surfaces;
- means for preventing excessive deflection of said mass past a predetermined distance in a direction perpendicular to opposed major surfaces of said base portion and said support member;
- means for damping vibration of said mass so as to achieve a frequency bandwidth greater than about 500 Hertz;
- means for detecting acceleration of said mass in a direction perpendicular to the plane of said base portion and said support member, wherein said means for detecting acceleration is provided on said U-shaped flexure member adjacent said base portion and said means for detecting acceleration comprising four piezoresistors electrically connected to form a Wheatstone bridge circuit; and
- signal conditioning and amplifying circuitry to produce an analog output voltage from said means for detecting acceleration, wherein said signal conditioning and amplifying circuitry is provided on said support member.

9. A thick film accelerometer as recited in claim 8 wherein said means for preventing excessive deflection of said mass is provided by disposition of said mass so as to overhang an inner edge of said unsupported end, wherein said U-shaped flexure member is prevented from excessive deflection by said mass contacting said support member.

10. A thick film accelerometer as recited in claim 8 wherein said means for damping vibration is provided by a viscous silicone oil.

11. A thick film accelerometer as recited in claim 8 further comprising a backplate to which said base portion and said support member are rigidly secured.

12. A thick film accelerometer comprising a substantially flat alumina substrate having opposed planar major surfaces and said alumina substrate including:
- an alumina base portion;
- a support member integrally formed with said alumina base portion;
- a backplate to which said base portion and said support means are rigidly secured;
- a U-shaped flexure member integrally formed with said alumina base portion essentially surrounding said support member so that a gap is provided substantially everywhere therebetween said U-shaped flexure member and said support member except at said base portion, said U-shaped flexure member having opposed major surfaces and an unsupported end;
- a mass provided on both of said opposed major surfaces of the unsupported end of said U-shaped flexure member so as to be oppositely disposed on said surfaces from said alumina base portion, such that said support member is disposed substantially intermediate between said alumina base portion and said mass, said mass also having a configuration and having a disposition on said unsupported end for preventing excessive deflection of said U-shaped member past a predetermined distance in any direction perpendicular to opposed major surfaces of said base portion and said support member by contacting said support member;
- means for damping vibration of said mass so as to achieve a frequency bandwidth greater than about 500 Hertz wherein said damping means is provided by a viscous silicone oil;
- means for detecting acceleration of said mass in a direction perpendicular to the plane of said base portion and said support member, wherein said means for detecting acceleration is provided on said U-shaped flexure member adjacent said base portion and said means for detecting acceleration comprising four piezoresistors electrically connected to form a Wheatstone bridge circuit; and
- signal conditioning and amplifying circuitry to produce an analog output voltage from said means for detecting acceleration, wherein said signal conditioning and amplifying circuitry is provided on said support member.

* * * * *